US011463213B2

(12) United States Patent
Lindoff et al.

(10) Patent No.: US 11,463,213 B2
(45) Date of Patent: Oct. 4, 2022

(54) PROCESSING DEVICE FOR BEAM MONITORING ON SERVING DOWNLINK BEAMS AND METHODS THEREOF

(71) Applicant: HUAWEI TECHNOLOGIES CO., LTD., Shenzhen (CN)

(72) Inventors: Bengt Lindoff, Kista (SE); Wenquan Hu, Lund (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 85 days.

(21) Appl. No.: 16/877,057

(22) Filed: May 18, 2020

(65) Prior Publication Data
US 2020/0280417 A1 Sep. 3, 2020

Related U.S. Application Data

(63) Continuation of application No. PCT/EP2017/080214, filed on Nov. 23, 2017.

(51) Int. Cl.
*H04W 4/00* (2018.01)
*H04L 5/00* (2006.01)
(Continued)

(52) U.S. Cl.
CPC ......... *H04L 5/0048* (2013.01); *H04B 7/0626* (2013.01); *H04B 7/0695* (2013.01);
(Continued)

(58) Field of Classification Search
CPC .... H04L 5/0048; H04L 5/0023; H04W 24/10; H04W 72/042
(Continued)

(56) References Cited

U.S. PATENT DOCUMENTS

2015/0257073 A1 9/2015 Park et al.
2018/0294860 A1* 10/2018 Hakola ................ H04W 48/08
(Continued)

FOREIGN PATENT DOCUMENTS

| WO | 2016086144 A1 | 6/2016 |
| WO | 2017045713 A1 | 3/2017 |
| WO | 2017063661 A1 | 4/2017 |

OTHER PUBLICATIONS

"3rd Generation Partnership Project; Technical Specification Group Radio Access Network; NR; Physical layer procedures for control (Release 15)," 3GPP TS 38.213 V1.2.0, pp. 1-38, 3rd Generation Partnership Project, Valbonne, France (Nov. 2017).
(Continued)

*Primary Examiner* — Maharishi V Khirodhar
(74) *Attorney, Agent, or Firm* — Leydig, Voit & Mayer, Ltd.

(57) ABSTRACT

A processing device for a client device obtains a set of reference signal configurations for a set of serving downlink beams. Each reference signal configuration of the set of reference signal configurations is associated with a respective serving downlink beam of the set of serving downlink beams. Each reference signal configuration of the set of reference signal configurations also includes a reference signal periodicity. The processing device further performs beam monitoring on the set of serving downlink beams based on the reference signal periodicities of the set of reference signal configurations.

12 Claims, 4 Drawing Sheets

(51) Int. Cl.
*H04B 7/06* (2006.01)
*H04W 24/10* (2009.01)
*H04W 72/04* (2009.01)

(52) U.S. Cl.
CPC .......... *H04L 5/0023* (2013.01); *H04W 24/10* (2013.01); *H04W 72/042* (2013.01)

(58) Field of Classification Search
USPC .......................................................... 370/329
See application file for complete search history.

(56) References Cited

U.S. PATENT DOCUMENTS

2019/0289573 A1* 9/2019 Hwang ............... H04W 72/087
2020/0036427 A1* 1/2020 Zhang ............... H04W 74/0833
2020/0328795 A1* 10/2020 Hao ...................... H04L 5/0051

OTHER PUBLICATIONS

"3rd Generation Partnership Project; Technical Specification Group Radio Access Network; Evolved Universal Terrestrial Radio Access (E-UTRA); Requirements for support of radio resource management (Release 15)," 3GPP TS 36.133 V15.0.0, 3rd Generation Partnership Project, Valbonne, France (Sep. 2017).

"3rd Generation Partnership Project; Technical Specification Group Radio Access Network; Evolved Universal Terrestrial Radio Access (E-UTRA); Physical layer procedures (Release 14)," 3GPP TS 36.213 V14.4.0, pp. 1-461, 3rd Generation Partnership Project, Valbonne, France (Sep. 2017).

"WF on Beam Failure Recovery," 3GPP TSG RAN WG1 Meeting #90bis, Prague, Czechia, R1-1719174, pp. 1-10, 3rd Generation Partnership Project, Valbonne, France (Oct. 9-13, 2017).

"Beam reporting for beam management," 3GPP TSG RAN WG1 Meeting #90, Prague, Czech Republic, R1-1713757, XP051316556, pp. 1-11, 3rd Generation Partnership Project, Valbonne, France (Aug. 21-25, 2017).

"Remaining details on beam failure recovery," 3GPP TSG RAN WG1 Meeting 91, Reno, USA, R1-1719423, Total 9 pages, 3rd Generation Partnership Project, Valbonne, France (Nov. 27-Dec. 1, 2017).

* cited by examiner

PROCESSING DEVICE FOR BEAM MONITORING ON SERVING DOWNLINK BEAMS AND METHODS THEREOF

CROSS-REFERENCE TO RELATED APPLICATIONS

This application is a continuation of International Application No. PCT/EP2017/080214, filed on Nov. 23, 2017, the disclosure of which is hereby incorporated by reference in its entirety.

FIELD

The present disclosure relates to a processing device. Furthermore, the present disclosure also relates to a client device comprising the processing device such as a baseband processor, corresponding methods and a computer program.

BACKGROUND

The 5G cellular system, also called new radio (NR), is currently being standardized. NR is targeting radio spectrum from below 1 GHz up to and above 60 GHz. To allow for such diverse radio environments, not only will different system bandwidths be supported, but also different numerologies, such as different sub-carrier-spacings (SCS), will be supported. Furthermore, for carriers over 10 GHz, multiple antennas and beamforming will be needed to combat the higher path loss at such high radio frequencies.

When beamforming is used, a next generation nodeB (gNB) transmits data in several directions in different transmit beams. The user equipment (UE), therefore, has to tune its own receive antennas in different receive beam directions to communicate with the gNB. In order for the UE to be able to detect and track the transmit beams of the gNB, the UE needs to perform beam monitoring. Hence, the gNB transmits known pilot signals in adjacent beams, which the UE receives and uses to detect possible transmit beams to switch to in case of changes in the radio environment. The principles behind beam monitoring can be compared to the cell search in legacy long term evolution (LTE), wideband code division multiple access (WCDMA), and high speed packet access (HSPA) systems. In such systems, the UE on a regular basis needs to scan neighbouring cells for possible handover candidates.

Each possible connection between the UE and the gNB is called a beam pair link (BPL), where a BPL consists of the best match between a transmit beam and a receive beam. The gNB will configure a set of BPLs for the UE to monitor. The configured set of monitored BPLs may be based on which BPL the UE has detected. This set can, for example, comprise all the BPLs associated with control channels and data channels between the gNB and the UE. The gNB will also configure a set of serving BPLs, which will be used to transmit associated control information to the UE. The set of serving BPLs is a subset or equal to the set of monitored BPLs. The UE monitors the quality of the set of monitored BPLs and reports the quality in beam measurement report to the gNB. When a monitored BPL beam becomes stronger than the current serving BPL a beam switch could be initiated. The exact procedure for the beam switching is not yet defined in the NR standard. One approach could be that the UE triggers a beam measurement report comprising the event that a target BPL is stronger than the current serving BPL. Another scenario would be that the gNB determines, e.g. using uplink management procedures, that a target BPL has become a suitable serving BPL. The gNB could then order a beam switch to the target BPL.

In scenarios where the UE drops the serving BPL, due to e.g. rotation or blocking of the UE, and the quality of all serving downlink BPLs becomes worse than a pre-determined quality, the UE should declare beam failure and start a beam recovery procedure. The UE performs the beam recovery procedure to try to recover from the beam failure. In order to monitor the quality of the serving BPLs as well as candidate BPLs, the UE could be configured to monitor either synchronization signal blocks (SSB) or channel state information reference signals (CSI-RSs) that can be assumed to be quasi-co-located with the control channel on the respective BPL.

SUMMARY

The present disclosure provides solutions that mitigate or solve drawbacks and problems of conventional solutions.

According to a first aspect of the disclosure, the above-mentioned and other objectives are achieved with a processing device for a client device, the processing device being configured to:

obtain a set of reference signal configurations for a set of serving downlink beams, wherein each reference signal configuration of the set of reference signal configurations is associated with a respective serving downlink beam of the set of serving downlink beams, and wherein each reference signal configuration of the set of reference signal configurations comprises a reference signal periodicity; and perform beam monitoring on the set of serving downlink beams based on the reference signal periodicities of the set of reference signal configurations.

In this disclosure, the terms downlink beam and uplink beam are used for describing the direction of transmission of signals and direction of reception of signals, respectively, for a client device. Hence, a specific beam can be interpreted as a certain spatial parameter setting or spatial filtering determined in the processing device. These settings or parameters may, for instance, be outputted from the processing device and used in the client device radio transceiver configuration for directing the transmission of signals or reception of signals in a certain direction.

Reference signal periodicity can in this disclosure be understood to indicate how often the reference signals are transmitted, i.e. at what rate the reference signals are transmitted. The reference signal periodicity may, e.g., be expressed as a time duration indicating the time between the transmission of two consecutive reference signals or as a rate value indicating the number of reference signals to be transmitted per time unit.

Beam monitoring can in this disclosure be understood to mean monitoring of reference signals in a beam to determine the quality of the beam, where the quality of the beam may correspond to a reliability of reception of a control channel transmitted in the beam. The reference signals may be quasi co-located with the control channel. That a reference signal is quasi-co-located with a control channel can be interpreted to mean that the reference signal and the control channel are transmitted and/or received in the same direction (and using, therefore, the same propagation path), such as in the same downlink beam and/or in the same uplink beam.

An advantage of the processing device is that the processing device is aware of how beam monitoring should be performed in a scenario with multiple serving downlink beams. Furthermore, by knowing the reference signal periodicity for respective serving downlink beam, the beam monitoring can be adapted depending on the current set of serving downlink beams. A controlled and flexible beam monitoring is thereby achieved.

In an implementation form of a processing device according to the first aspect, the processing device is further configured to:

determine at least one beam monitoring periodicity based on the reference signal periodicities; and perform beam monitoring on the set of serving downlink beams according to the at least one determined beam monitoring periodicity.

An advantage with this implementation form is that the processing device knows when to perform beam monitoring.

In an implementation form of a processing device according to the first aspect, the processing device is further configured to:

perform beam monitoring based on determining link qualities for the set of serving downlink beams, wherein each link quality corresponds to a hypothetical error rate of a control channel transmitted in a serving downlink beam of the set of serving downlink beams.

Hence, in this implementation form, during the beam monitoring, the processing device determines the link qualities of the serving beams. An advantage with this implementation form is that the processing device can determine when the serving downlink beams are of sufficient quality for communication with the network access node, and thereby a reliable communication is achieved.

In an implementation form of a processing device according to the first aspect, a first reference signal configuration of the set of reference signal configurations associated with a respective first serving downlink beam comprises a first reference signal periodicity, and a second reference signal configuration of the set of reference signal configurations associated with a respective second serving downlink beam comprises a second reference signal periodicity; and wherein the processing device is further configured to:

determine a first beam monitoring periodicity based on the first reference signal periodicity and a second beam monitoring periodicity based on the second reference signal periodicity; and perform beam monitoring on the first serving downlink beam according to the first beam monitoring periodicity and beam monitoring on the second serving downlink beam according to the second beam monitoring periodicity.

An advantage with this implementation form is that the processing device has the possibility of performing the beam monitoring individually for different beams in dependence on their respective reference signal periodicity. Hence, it can be ensured that the processing device makes the best use of the information it is given in regards to the quality of the different serving beams and no reference signal is "wasted".

In an implementation form of a processing device according to the first aspect, the first beam monitoring periodicity is equal to the first reference signal periodicity, and the second beam monitoring periodicity is equal to the second reference signal periodicity.

In an implementation form of a processing device according to the first aspect, the processing device is further configured to:

obtain a longest periodicity of the reference signal periodicities of the set of reference signal configurations;

determine a beam monitoring periodicity based on the longest reference signal periodicity; and perform beam monitoring on the set of serving downlink beams according to the determined beam monitoring periodicity.

An advantage with this implementation form is that the processing device may reduce the beam monitoring periodicity on some of the serving downlink beams, which reduces the processing in the processing device and thereby saves power but still enables a sufficiently good determination of the availability of the different serving beams.

In an implementation form of a processing device according to the first aspect, the beam monitoring periodicity is equal to the longest reference signal periodicity.

An advantage with this implementation form is that the processing device may reduce the beam monitoring periodicity on some of the serving downlink beams, which reduces the processing in the processing device and thereby saves power.

In an implementation form of a processing device according to the first aspect, the processing device is further configured to:

obtain an updated longest periodicity of the reference signal periodicities of the set of reference signal configurations;

determine an updated beam monitoring periodicity based on the updated longest reference signal periodicity; and perform beam monitoring on the set of serving downlink beams according to the updated beam monitoring periodicity.

An advantage with this implementation form is that the processing device adapts the beam monitoring to the current set of serving downlink beams, and hence reliable communication is achieved also in mobility scenarios.

In an implementation form of a processing device according to the first aspect, the processing device is further configured to:

obtain the updated longest periodicity based on a re-configuration of the set of serving downlink beams.

An advantage with this implementation form is that the processing device adapts the beam monitoring to the current set of serving downlink beams, and hence reliable communication is achieved also in mobility scenarios.

In an implementation form of a processing device according to the first aspect, the processing device is further configured to:

monitor a number of detected beam failure instances, wherein a beam failure instance is a time instance when link qualities of all serving downlink beams of the set of serving downlink beams are below a link quality threshold value; and initiate a beam recovery request procedure if the number of consecutive detected beam failure instances exceeds a beam failure instance threshold value N.

To initiate a beam recovery request procedure can be understood in this disclosure to mean to initiate a (radio) link reconfiguration, wherein a radio link can be a radio communication link between a client device comprising the processing device and a network access node.

An advantage with this implementation form is that the processing device, by knowing the reference signal periodicity for respective serving downlink beam, can determine the beam failure instances and time duration between beam failure instances. The processing device is thereby given a correct measurement to use for declaring beam failure. Hence, the processing device can initiate beam recovery procedures only when necessary, and thereby reduce the load on random access resources in the system.

In an implementation form of a processing device according to the first aspect, the processing device is further configured to:

obtain a longest periodicity of the reference signal periodicities of the set of reference signal configurations; and monitor the number of detected beam failure instances with a monitoring periodicity larger than or equal to the longest periodicity of the reference signal periodicities.

An advantage with this implementation form is that the processing device is given a correct measurement to use for detecting beam failure. Thereby, the risk for false detection is minimized and beam recovery is only triggered when necessary.

In an implementation form of a processing device according to the first aspect, the processing device is further configured to:

receive a beam monitoring configuration from a network access node associated with the set of serving downlink beams; and perform beam monitoring according to the received beam monitoring configuration.

An advantage with this implementation form is that the processing device and network access node are aligned regarding beam monitoring periodicity, leading to a more reliable wireless communication system.

In an implementation form of a processing device according to the first aspect, the processing device is further configured to:

perform beam monitoring according to a pre-defined beam monitoring configuration.

An advantage with this implementation form is that the processing device and network access node are aligned regarding beam monitoring periodicity, without a need for signalling. Thereby, the overall system capacity in the system is improved.

In an implementation form of a processing device according to the first aspect, a reference signal configuration is at least one of a channel state information reference signal, CSI-RS, resource configuration or a synchronization signal block, SSB, index.

An advantage with this implementation form is that the processing device knows which pilot or reference signals to monitor. Thereby, an aligned view of beam monitoring between the processing device and the network access node is achieved.

According to a second aspect of the present disclosure, the above mentioned and other objectives are achieved with a client device for a wireless communication system, the client device comprising a processing device according to any of the implementation forms of a processing device according to the first aspect.

An advantage of the client device is that the client device is aware of how beam monitoring should be performed in a scenario with multiple serving downlink beams. The client device is thereby aligned with the network access node regarding beam monitoring. Furthermore, by knowing the reference signal periodicity for respective serving downlink beam, the beam monitoring can be adapted depending on the current set of serving downlink beams. A controlled and flexible beam monitoring is thereby achieved.

According to a third aspect of the present disclosure, the above mentioned and other objectives are achieved with a method for a processing device, wherein the method comprises:

obtaining a set of reference signal configurations for a set of serving downlink beams, wherein each reference signal configuration of the set of reference signal configurations is associated with a respective serving downlink beam of the set of serving downlink beams, and wherein each reference signal configuration of the set of reference signal configurations comprises a reference signal periodicity; and performing beam monitoring on the set of serving downlink beams based on the reference signal periodicities of the set of reference signal configurations.

The method according to the third aspect can be extended into implementation forms corresponding to the implementation forms of the processing device according to the first aspect. Hence, an implementation form of the method comprises the feature(s) of the corresponding implementation form of the processing device.

The advantages of the methods according to the third aspect are the same as those for the corresponding implementation forms of the processing device according to the first aspect.

The present disclosure also relates to a computer program, characterized in code means, which, when run by processing means, causes the processing means to execute any method according to the present disclosure. Further, the present disclosure also relates to a computer program product comprising a computer readable medium and the mentioned computer program, wherein the computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present disclosure will be apparent from the following detailed description.

BRIEF DESCRIPTION OF THE DRAWINGS

The appended drawings are intended to clarify and explain different embodiments of the present disclosure, in which.

DETAILED DESCRIPTION

Figure 1:
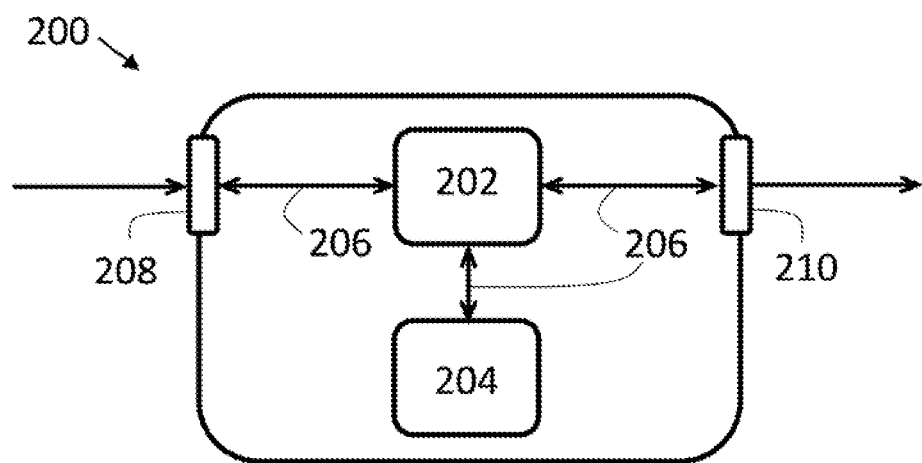
FIG. 1 shows a processing device according to an embodiment of the disclosure.

FIG. 1 shows a processing device 200 according to an embodiment of the present disclosure. In the embodiment shown in FIG. 1, the processing device 200 comprises at least one processor core 202, which can be coupled to an internal or external memory 204 with coupling/communication means 206 known in the art. The processing device 200 may further comprise a plurality of processor cores 202. The memory 204 may store program code that, when being executed, causes the processor core(s) 202 of the processing device 200 to performing the functions and actions described herein. The processing device 200 further comprises input means 208 and output means 210, which are both coupled to the processor core 202 with coupling/communication means 206 known in the art.

In this disclosure, that the processing device 200 is configured to perform certain functions or actions can be understood to mean that the processing device 200 comprises suitable means, such as the processor core 202, configured to perform the functions or actions. The processing device 200 may for example be a baseband processor for use in a client device for a wireless communication system.

Figure 4:
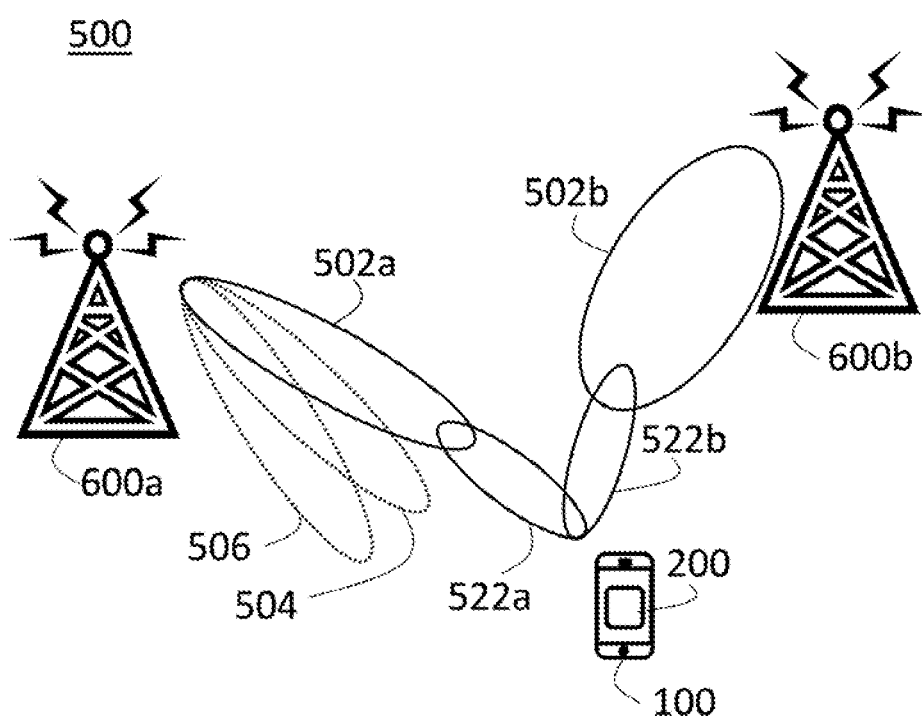
FIG. 4 shows a wireless communication system according to an embodiment of the disclosure.

The processing device 200 in FIG. 1 is configured to obtain a set of reference signal configurations for a set of serving downlink beams 502a, 502b, . . . , 502n (a set of serving downlink beams 502a, 502b is shown in FIG. 4). Each reference signal configuration of the set of reference signal configurations is associated with a respective serving downlink beam of the set of serving downlink beams 502a, 502b, . . . , 502n, and each reference signal configuration of the set of reference signal configurations comprises a reference signal periodicity. The processing device 200 is further configured to perform beam monitoring on the set of serving downlink beams 502a, 502b, . . . , 502n based on the reference signal periodicities of the set of reference signal configurations.

Figure 2:
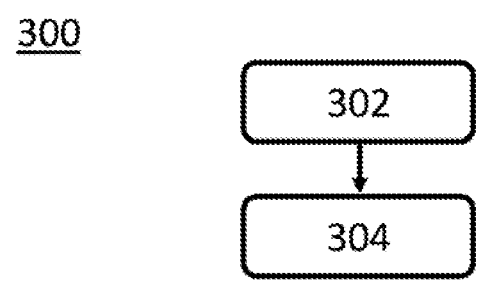
FIG. 2 shows a method according to an embodiment of the disclosure.

FIG. 2 shows a flow chart of a corresponding method 300, which may be executed in a processing device 200, such as the one shown in FIG. 1. The method 300 comprises obtaining 302 a set of reference signal configurations for a set of serving downlink beams 502a, 502b, . . . , 502n. Each reference signal configuration of the set of reference signal configurations is associated with a respective serving downlink beam of the set of serving downlink beams 502a, 502b, . . . , 502n, and each reference signal configuration of the set of reference signal configurations comprises a reference signal periodicity. The method 300 further comprises performing 304 beam monitoring on the set of serving downlink beams 502a, 502b, . . . , 502n based on the reference signal periodicities of the set of reference signal configurations.

Figure 3:
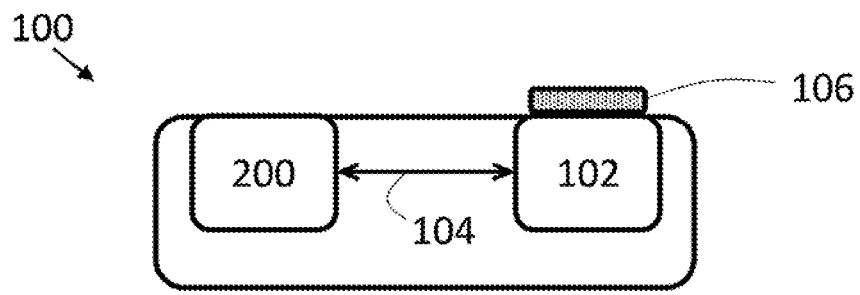
FIG. 3 shows a client device according to an embodiment of the disclosure.

The processing device 200 may be comprised in a client device, such as e.g. the client device 100 shown in FIG. 3. The processing device 200 may hence be a functional module, e.g. a communication module, such as a base band processor, configured to operate in the client device 100. In the embodiment shown in FIG. 3, the client device 100 comprises the processing device 200 and a transceiver/modem 102. The processing device 200 is coupled to the transceiver 102 by communication means 104 known in the art. The client device 100 further comprises an antenna or an antenna array 106 coupled to the transceiver 102, which means that the client device 100 is configured for wireless communications in a wireless communication system.

FIG. 4 shows a wireless communication system 500 according to an embodiment of the present disclosure. The wireless communication system 500 comprises one client device 100 and two network access nodes 600a, 600b, all configured to operate in the wireless communication system 500. The client device 100 comprises a processing device 200. For simplicity, the wireless communication system 500 shown in FIG. 4 only comprises one client device 100 and two network access node 600a, 600b. However, the wireless communication system 500 may comprise any number of client devices 100 and any number of network access nodes 600 without deviating from the scope of the present disclosure.

In the wireless communication system 500, beamforming is used such that data is transmitted in several directions in different downlink beams and uplink beams between the client device 100 and the network access nodes 600a, 600b. In the embodiment shown in FIG. 4, the client device 100 is in a connected mode with the network access node 600a using a serving downlink beam 502a and with the network access node 600b using a serving downlink beam 502b. This means that the client device 100 is in a mode in which it can communicate with the network access nodes 600a, 600b over a set of serving downlink beams 502a, 502b. The connected mode may e.g. be a radio resource control (RRC) connected mode, or another connected mode, where the network access nodes 600a, 600b are aware of the client device 100. In addition to the set of serving downlink beams 502a, 502b, the client device 100 receives a set of candidate downlink beams 504, 506 from the network access node 600a. The client device 100 further has a serving uplink beam 522a to the network access nodes 600a and a serving uplink beam 522b to the network access node 600b. In FIG. 4 only two serving downlink beams 502a, 502b are shown. However, any number of serving downlink beams may exist between the client device 100 and the network access nodes 600a, 600b without deviation from the scope of the present disclosure.

In scenarios where a client device 100 has multiple serving downlink beams, different serving downlink beams may transmit reference signals with different reference signal periodicity. This may be, e.g., the case if the serving downlink beams have different width. In FIG. 4, the serving downlink beam 502a is assumed to be a high throughput narrow beam where large antenna gain is needed for achieving good signal-to-interference-plus-noise ratio (SINR) and thereby high throughput. Because the serving downlink beam 502a is a narrow beam, a short reference signal periodicity may be used to allow the client device 100 to accurately monitor possible movements. Thereby, beam switching to candidate beams 504, 506 may be performed in time to maintain a good connection. To get a short reference signal periodicity, the serving downlink beam 502a may be configured with channel state information reference signals (CSI-RS), e.g. with a periodicity of 10 milliseconds. The serving downlink beam 502b in FIG. 4 is assumed to be a fallback beam that the client device 100 has for control signaling. Thus, the serving downlink beam 502b may be a wide beam to reduce the risk of dropping the connection. Because the serving downlink beam 502b is a wide beam, a longer reference signal periodicity may be used as the need for performing beam switching is lower than for a narrow beam. Thus, the synchronization signal block (SSB) signals from the network access node 600b may be used as reference signals. The SSB signals may be quasi co-located with the control channel and physical data channel of the network access node 600b, and are typically configured to have a periodicity of 20 milliseconds. Hence, in this example, the reference signals for the downlink serving beam 502a are transmitted twice as often as the reference signals of the downlink serving beam 502b. Therefore, the serving downlink beam 502a and the serving downlink beam 502b have different reference signal periodicities. This results in that the client device 100 in FIG. 4 is in a scenario where it should perform beam monitoring on a set of serving downlink beam with different reference signal periodicities. Such a scenario, can be handled by the processing device 200 according to embodiments of the present disclosure.

The processing device 200, which may be comprised in a client device 100 currently configured with a set of serving downlink beams 502a, 502b, . . . , 502n, determines how to perform beam monitoring for the set of serving downlink beams 502a, 502b, . . . , 502n. The determination is based on the reference signal periodicities associated with the serving downlink beams in the set of serving downlink beams 502a, 502b, . . . , 502n. For each of the serving downlink beams in the set of serving downlink beams 502a, 502b, . . . , 502n, the processing device 200 obtains a reference signal configuration comprising a reference signal periodicity for the respective serving downlink beam. The reference signal configuration may be at least one of a CSI-RS resource configuration or a SSB index. The processing device 200 may, e.g., obtain the set of reference signal configurations by decoding RRC configuration messages received from the network access node(s) 600 associated with the set of serving downlink beams 502a, 502b, . . . , 502n. The respective reference signal configurations may be received per serving downlink beam, or in a single message from a single network access node 600. Alternatively, the reference signal configuration may be obtained during initial access. This approach may typically be used when the reference signal configuration is a SSB index. The SSB index may hence be determined during a cell search procedure. From the CSI-RS resource configurations or the SSB index the processing device 200 may obtain the reference signal periodicities.

Based on the obtained reference signal periodicities of the set of reference signal configurations, the processing device 200 performs beam monitoring on the set of serving downlink beams 502a, 502b, . . . , 502n. Beam monitoring can herein be understood to mean monitoring of reference signals in a serving downlink beam, and is performed to determine the quality of respective serving downlink beam, i.e. to determine whether a respective serving downlink beam is reliable or not. The quality of a serving downlink beam may correspond to a reliability of reception of a control channel transmitted in the serving downlink beam. The monitored reference signals can be quasi co-located with the control channel, and can hence be used to determine the reliability of reception of the control channel. That a reference signal is quasi-co-located with a control channel can be interpreted to mean that the reference signal and the control channel are transmitted and/or received in the same direction, such as in the same downlink beam and/or in the same uplink beam. The processing device 200 may hence perform beam monitoring based on/by determining link qualities for the set of serving downlink beams 502a, 502b, . . . , 502n, where each link quality may correspond to a hypothetical error rate of a control channel transmitted in a serving downlink beam of the set of serving downlink beams 502a, 502b, . . . , 502n. The hypothetical error rate may be, e.g., determined based on a SNIR or Layer 1 reference signal received power (RSRP) measurements on reference signals transmitted in the serving downlink beam using methods well known in the art.

In embodiments of the present disclosure, the processing device 200 may be configured to perform beam monitoring according to a beam monitoring configuration. The beam monitoring configuration may comprise information, such as, e.g., rules for performing beam monitoring. The beam monitoring configuration may be pre-defined in the processing device 200, e.g., according to a standard for the communication between a client device 100 and a network access node 600. In this case, the processing device 200 therefore performs beam monitoring according to the pre-defined beam monitoring configuration. Alternatively, the processing device 200 may receive the beam monitoring configuration from the network access node 600 associated with the set of serving downlink beams 502a, 502b, . . . , 502n. The beam monitoring configuration may be signaled in suitable control signaling. In this case, the processing device 200, therefore, performs beam monitoring according to the received beam monitoring configuration.

Furthermore, beam monitoring may, in embodiments, be performed according to at least one beam monitoring periodicity. In such embodiments, the processing device 200 may determine the beam monitoring periodicity based on the reference signal periodicities, and perform beam monitoring on the set of serving downlink beams 502a, 502b, . . . , 502n, according to the determined beam monitoring periodicity. The beam monitoring periodicity for a given serving downlink beam 502a, 502b, . . . , 502n can be chosen to be identical with the corresponding reference signal periodicity. This is advantageous, for example, if a highly reliable beam monitoring is desired in which beam failures should be found as quick possible. Alternatively, the beam monitoring periodicity for a given serving downlink beam 502a, 502b, . . . , 502n can be chosen to be larger than the corresponding reference signal periodicity, i.e. not every reference signal transmission occasion is used by the processing device for beam monitoring, but only a subset. This is advantageous if a small delay in Beam Failure declaration is acceptable, but power saving is desired. The processing device 200 can be configured to switch between the two named solutions.

Examples of how the beam monitoring periodicity may be determined in scenarios where different serving downlink beams have different reference signal periodicities will now be described with reference to FIGS. 5A-5C.

Figures 5A, 5B, 5C:
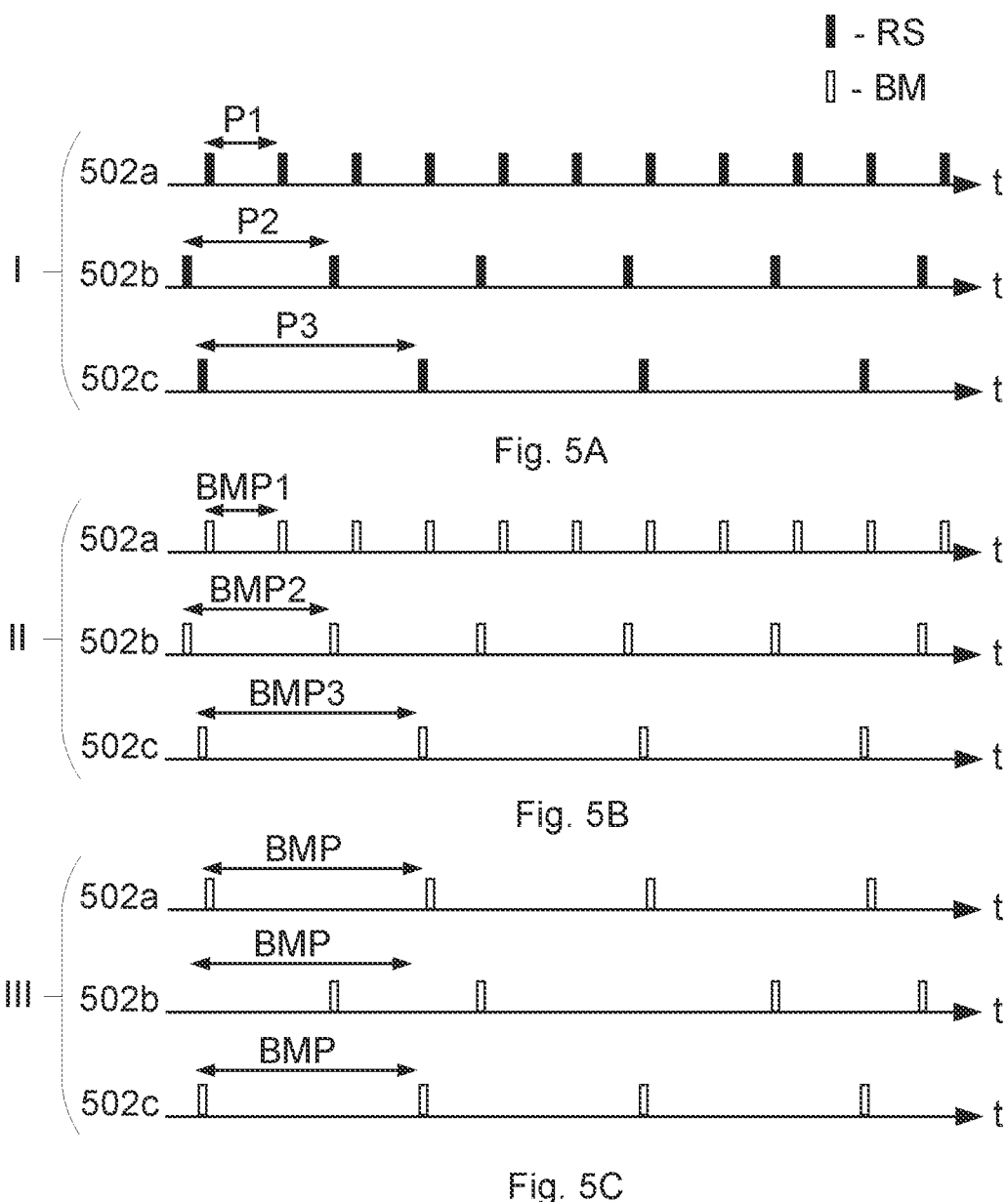
FIGS. 5A-5C show beam monitoring according to embodiments of the invention.

FIG. 5A shows the reference signal periodicity P1, P2, P3 of three serving downlink beams 502a, 502b, 502c according to an embodiment. The reference signal periodicity may be the time duration between two consecutive reference signals transmitted on the respective serving downlink beam. Each transmission of a reference signal RS is illustrated in FIG. 5A with a black column. In FIG. 5A, a first reference signal configuration of the set of reference signal configurations associated with a respective first serving downlink beam 502a comprises a first reference signal periodicity P1, a second reference signal configuration of the set of reference signal configurations associated with a respective second serving downlink beam 502b comprises a second reference signal periodicity P2, and a third reference signal configuration of the set of reference signal configurations associated with a respective third serving downlink beam 502c comprises a third reference signal periodicity P3. The second reference signal periodicity P2 is 2×P1, while the third reference signal periodicity P3 is 3×P1.

According to embodiments of the invention, the processing device 200 determines a beam monitoring periodicity for each serving downlink beam based on the reference signal periodicity of that serving downlink beam. Based on the reference signal periodicity P1, P2, P3 shown in FIG. 5A, the processing device 200 would hence determine a first beam monitoring periodicity BMP1 based on the first reference signal periodicity P1, a second beam monitoring periodicity BMP2 based on the second reference signal periodicity P2, and a third beam monitoring periodicity BMP3 based on the third reference signal periodicity P3. That a beam monitoring periodicity is determined based on a reference signal periodicity may e.g. mean that the beam monitoring periodicity is determined to be equal to the reference signal periodicity or a multiple of the reference signal periodicity but is not limited thereto. In the embodiment shown in FIG. 5B, the first beam monitoring periodicity BMP1 is determined to be equal to the first reference signal periodicity P1, the second beam monitoring periodicity BMP2 is determined to be equal to the second reference signal periodicity P2, and the third beam monitoring periodicity BMP3 is determined to be equal to the third reference signal periodicity P3. The beam monitoring performed by the processing device 200 in this case is shown in FIG. 5B, where each white column illustrates a beam monitoring BM occasion. As shown in FIG. 5B, the processing device 200 hence performs beam monitoring on the first serving downlink beam 502a according to the first beam monitoring periodicity BMP1, beam monitoring on the second serving downlink beam 502b according to the second beam monitoring periodicity BMP2, and beam monitoring on the third serving downlink beam 502c according to the third beam monitoring periodicity BMP3. Hence, each reference signal transmission occasion is used for beam monitoring by the processing device 200.

FIG. 5C shows an embodiment where the processing device 200 determines a beam monitoring periodicity based on a longest periodicity of the reference signal periodicities of the set of reference signal configurations. In this case, the processing device 200 obtains a longest periodicity of the reference signal periodicities of the set of reference signal configurations and further determines a beam monitoring periodicity based on the longest reference signal periodicity. That a beam monitoring periodicity is determined based on a longest reference signal periodicity may e.g. mean that the beam monitoring periodicity is determined to be equal to the longest reference signal periodicity or determined to be a multiple of the longest reference signal periodicity but is not limited thereto. In the embodiment shown in FIG. 5C, the third reference signal periodicity P3 is the longest periodicity and the beam monitoring periodicity BMP is determined to be equal to the longest reference signal periodicity. Thus, the beam monitoring periodicity BMP is determined to be equal the third reference signal periodicity P3. The beam monitoring performed by the processing device 200 in this case is shown in FIG. 5C, where each white column illustrates a beam monitoring BM occasion. As shown in FIG. 5C, the processing device 200 hence performs beam monitoring on the set of serving downlink beams 502a, 502b, 502c according to the determined beam monitoring periodicity BMP. Note that the processing device 200 may perform beam monitoring at different time instance for each serving downlink beam, however the beam monitoring periodicity BMP will be equal to the third reference signal periodicity P3 for all serving downlink beams. Furthermore, the processing device 200 can only perform beam monitoring when a reference signal is transmitted and hence the measurement pattern may be irregular. This is the case for the serving downlink beam 502b, as illustrated in FIG. 5C. However, the processing device 200 should perform one measurement sample per reference signal periodicity.

Which of the above described approaches the processing device 200 should use to determine the beam monitoring periodicity may be, e.g., defined in the previously mentioned beam monitoring configuration. Hence, this information may either be received from the network access node 600 or pre-defined in the processing device 200 according to a standard for the communication between a client device 100 and a network access node 600.

The set of serving downlink beams 502a, 502b, ..., 502n may be re-configured as the client device 100 moves in the wireless communication system 500 or as radio conditions change. For example, serving downlink beams may be added to or deleted from the set of serving downlink beams 502a, 502b, ..., 502n. This may result in that the set of reference signal configurations that the client device 100 should monitor is updated and hence that the reference signal periodicities associated with the set of serving downlink beams 502a, 502b, ..., 502n may be updated. Upon an update of a reference signal periodicity associated with the set of serving downlink beams 502a. 502b, ..., 502n, the processing device 200 may determine an updated beam monitoring periodicity. When the beam monitoring periodicity is determined based on the reference signal periodicity of each respective serving downlink beam, the processing device 200 determines an updated beam monitoring periodicity for a serving downlink beam based on the updated reference signal periodicity of that serving downlink beam. When the beam monitoring periodicity is determined based on the longest reference signal periodicity, the processing device 200 determines an updated beam monitoring periodicity if the updated reference signal periodicity updates the longest reference signal periodicity. In other words, the processing device 200 obtains the updated longest periodicity of the reference signal periodicities of the set of reference signal configurations and determines an updated beam monitoring periodicity based on the updated longest reference signal periodicity. Furthermore, the processing device 200 performs beam monitoring on the set of serving downlink beams 502a, 502b, ..., 502n according to the updated beam monitoring periodicity. As previously described, the updated longest periodicity may be obtained based on a re-configuration of the set of serving downlink beams 502a, 502b, ..., 502n. Taking the example from FIG. 5C and assuming serving downlink beam 502c would be deactivated, the longest reference signal periodicity would be P2. Hence, the beam monitoring periodicity would be based on the (updated) longest reference signal periodicity P2. E.g. the beam monitoring periodicity could be chosen as BMP2.

Moreover, the processing device 200 may, in embodiments, use the obtained information about reference signal periodicities associated with the set of serving downlink beams 502a, 502b, ..., 502n when detecting beam failure instances. A beam failure instance may herein be a time instance when link qualities of all serving downlink beams of the set of serving downlink beams 502a, 502b, ..., 502n are below a link quality threshold value. The processing device 200 may monitor a number of detected beam failure instances. If the number of consecutive detected beam failure instances exceeds a beam failure instance threshold value N, the processing device 200 may initiate a beam recovery request procedure. In embodiments, the processing device 200 may monitor the number of detected beam failure instances with a monitoring periodicity which is larger than or equal to a longest periodicity of the reference signal periodicities. The longest periodicity of the reference signal periodicities of the set of reference signal configurations may be obtained by the processing device 200 from the set of obtained reference signal configurations.

Figure 6A:
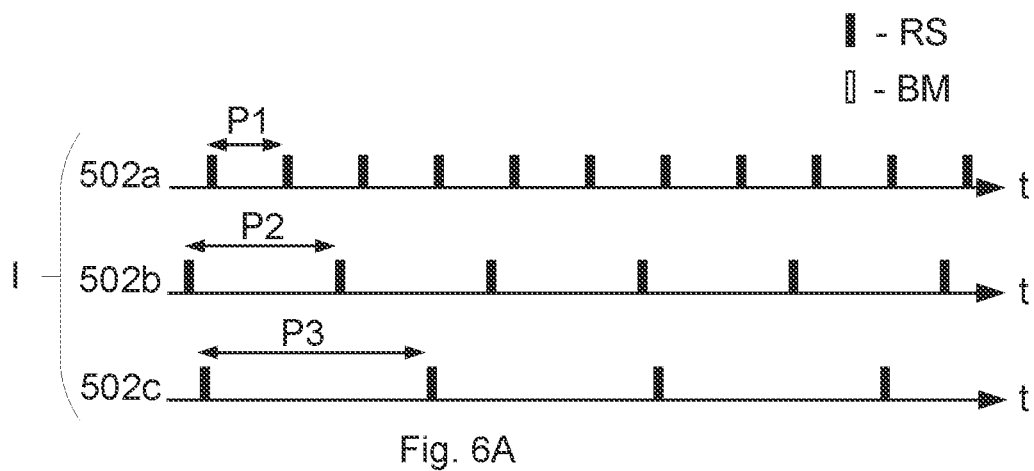
FIG. 6 shows monitoring of number of detected beam failure instances according to an embodiment of the disclosure.

Further details related to how the processing device 200 monitors the number of detected beam failure instances will now be described with reference to FIGS. 6A-6B. FIG. 6A shows the reference signal periodicity P1, P2, P3 of the same three serving downlink beams 502a, 502b, 502c as shown FIG. 5A. In the embodiment shown in FIG. 6A, the processing device 200 is assumed to be configured to monitor the number of beam failure instances with a monitoring periodicity which is equal to the longest periodicity of the reference signal periodicities, i.e. with a monitoring periodicity which is equal to the third reference signal periodicity P3. Furthermore, the processing device 200 performs beam monitoring according to a beam monitoring periodicity for each serving downlink beam which is based on the reference signal periodicity of that serving downlink beam, as previously described with reference to FIG. 5B. The processing device 200 monitors the number of detected beam failure instances and hence counts the number of times the link qualities of all three serving downlink beams 502*a*, 502*b*, 502*c* are below a link quality threshold value. The link quality threshold value may e.g. be pre-defined or configured by the network access node 600.

Figure 6B:
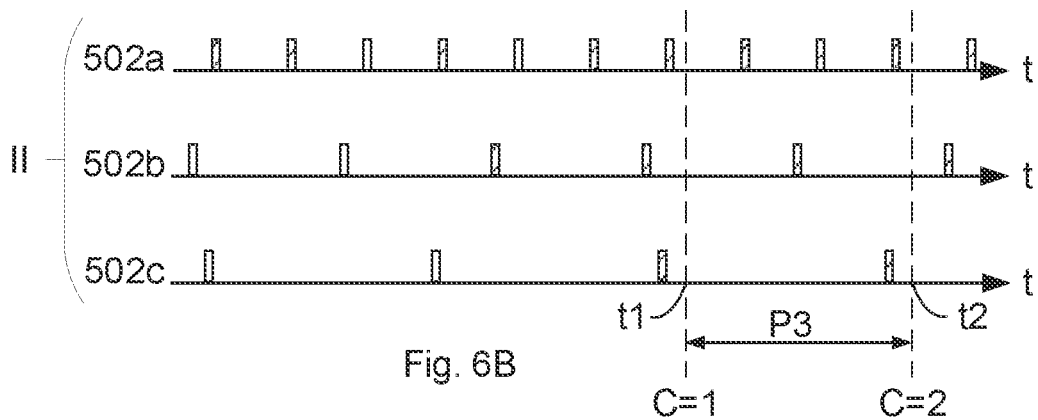

FIG. 6B an occasion where the link quality of a serving downlink beam is below the link quality threshold value is indicated with a dashed column. As shown in FIG. 6B, the link quality of the serving downlink beam 502*a* first varies around the quality threshold value, with some measurement samples being above the quality threshold value and some measurement samples being below the quality threshold value. However, around a time instance t1 the serving downlink beam 502*a* is lost and all the following measurement samples are hence below the quality threshold value. At approximately the same time also the serving downlink beams 502*b*. 502*c* are lost and a beam failure instance occurs. When the beam failure instance occurs, the processing device 200 detects the beam failure instance and increases a beam failure instance counter C representing the number of detected beam failure instances. This is illustrated in FIG. 6B where the beam failure instance counter C is set to 1 at the time instance t1. Furthermore, the processing device 200 checks whether the beam failure instance counter C exceeds a beam failure instance threshold value N. In the embodiment shown in FIG. 6B the beam failure instance threshold value N is assumed to be set to 2. Thus, the beam failure instance counter C does not exceed the beam failure instance threshold value N at time instance t1 and the processing device 200 continues to perform beam monitoring according to the determined beam monitoring periodicities and to monitor the number of detected beam failure instances according to the third reference signal periodicity P3. Once the counter C exceeds the beam failure instance threshold value N, i.e. at the second detected beam failure instance at time instance t2 in the embodiment shown in FIG. 6B, the processing device 200 initiates a beam recovery request procedure (not shown in FIG. 6B). The beam recovery request procedure may be performed using procedures known in the art. In some embodiments, the beam recovery request procedure is only initiated if a candidate beam exists. Hence, in case no candidate beams exist, the client device 100 refrains from performing beam recovery request. However, the client device 100 may continue to search for candidate beams until a candidate beam is found or until a radio link failure occurs.

Furthermore, if the set of serving downlink beams 502*a*, 502*b*, . . . , 502*n* is re-configured such that the longest periodicity of the reference signal periodicities is updated, the processing device 200 updates the monitoring periodicity used to monitor the number of detected beam failure instances to be at least as long as the updated longest reference signal periodicity in the updated set of serving downlink beams 502*a*, 502*b*, . . . , 502*n*.

The client device 100 herein, may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network access node 600 herein may also be denoted as a radio network access node, an access network access node, an access point, or a base station, e.g. a Radio Base Station (RBS), which in some networks may be referred to as transmitter, "eNB", "eNodeB", "NodeB" or "B node", depending on the technology and terminology used. The radio network access nodes may be of different classes such as, e.g., macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

Furthermore, any method according to embodiments of the present disclosure may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 100 and the network access node 600 comprises the necessary communication capabilities in the form of, e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processor(s) of the client device 100 and the network access node 600 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

What is claimed is:

1. A processing device for a client device, the processing device comprising:
one or more processors which, alone or in combination, are configured to provide for execution of the following steps:
obtaining a set of reference signal configurations for a set of serving downlink beams, wherein each reference signal configuration of the set of reference signal configurations is associated with a respective serving downlink beam of the set of serving downlink beams, wherein each reference signal configuration of the set of reference signal configurations comprises a respective reference signal periodicity of a corresponding set of reference signal periodicities, wherein a first reference signal configuration of the set of reference signal configurations associated with a first serving downlink beam of the set of serving downlink beams comprises a first reference signal periodicity of the corresponding set of reference signal periodicities, and wherein a second reference signal configuration of the set of reference signal configurations associated with a second serving downlink beam of the set of serving downlink beams comprises a second reference signal periodicity of the set of reference signal periodicities;
determining a first beam monitoring periodicity based on the first reference signal periodicity and a second beam monitoring periodicity based on the second reference signal periodicity; and
performing beam monitoring on the set of serving downlink beams based on the reference signal periodicities of the set of reference signal configurations by:
performing the beam monitoring on the first serving downlink beam according to the first beam monitoring periodicity; and
performing the beam monitoring on the second serving downlink beam according to the second beam monitoring periodicity.

2. The processing device according to claim 1, wherein the processing device is further configured to:
perform the beam monitoring based on determining link qualities for the set of serving downlink beams, wherein each link quality of the link qualities corresponds to a hypothetical error rate of a control channel transmitted in a serving downlink beam of the set of serving downlink beams.

3. The processing device according to claim 1, wherein the first beam monitoring periodicity is equal to the first reference signal periodicity, and the second beam monitoring periodicity is equal to the second reference signal periodicity.

4. The processing device according to claim 1, wherein the processing device is further configured to:
monitor a number of detected beam failure instances, wherein a beam failure instance is a time instance when link qualities of all serving downlink beams of the set of serving downlink beams are below a link quality threshold value; and
initiate a beam recovery request procedure based upon a number of consecutive detected beam failure instances exceeding a beam failure instance threshold value N.

5. The processing device according to claim 1, wherein the processing device is further configured to:
receive a beam monitoring configuration from a network access node associated with the set of serving downlink beams; and
perform the beam monitoring according to the received beam monitoring configuration.

6. The processing device according to claim 1, wherein the processing device is further configured to:
perform the beam monitoring according to a pre-defined beam monitoring configuration.

7. The processing device according to claim 1, wherein a reference signal configuration of the set of reference signal configurations is at least one of a channel state information reference signal, CSI-RS, resource configuration, or a synchronization signal block, SSB, index.

8. The processing device according to claim 1, wherein the second reference signal periodicity is different from the first reference signal periodicity.

9. The processing device according to claim 1, wherein the set of reference signal configurations is predefined.

10. A client device for a wireless communication system, the client device comprising:
a processing device configured to:
obtain a set of reference signal configurations for a set of serving downlink beams, wherein each reference signal configuration of the set of reference signal configurations is associated with a respective serving downlink beam of the set of serving downlink beams, wherein each reference signal configuration of the set of reference signal configurations comprises a respective reference signal periodicity of a corresponding set of reference signal periodicities, wherein a first reference signal configuration of the set of reference signal configurations associated with a first serving downlink beam of the set of serving downlink beams comprises a first reference signal periodicity, and wherein a second reference signal configuration of the set of reference signal configurations associated with a second serving downlink beam of the set of serving downlink beams comprises a second reference signal periodicity;
determine a first beam monitoring periodicity based on the first reference signal periodicity and a second beam monitoring periodicity based on the second reference signal periodicity; and
perform beam monitoring on the set of serving downlink beams based on the reference signal periodicities of the set of reference signal configurations by:
performing the beam monitoring on the first serving downlink beam according to the first beam monitoring periodicity; and
performing the beam monitoring on the second serving downlink beam according to the second beam monitoring periodicity.

11. A method for operating a processing device, the method comprising:
obtaining a set of reference signal configurations for a set of serving downlink beams, wherein each reference signal configuration of the set of reference signal configurations is associated with a respective serving downlink beam of the set of serving downlink beams, wherein each reference signal configuration of the set of reference signal configurations comprises a respective reference signal periodicity of a corresponding set of reference signal periodicities, wherein a first reference signal configuration of the set of reference signal configurations associated with a first serving downlink beam of the set of serving downlink beams comprises a first reference signal periodicity, and wherein a second reference signal configuration of the set of reference signal configurations associated with a second serving downlink beam of the set of serving downlink beams comprises a second reference signal periodicity;

determining a first beam monitoring periodicity based on the first reference signal periodicity and a second beam monitoring periodicity based on the second reference signal periodicity; and performing beam monitoring on the set of serving downlink beams based on the reference signal periodicities of the set of reference signal configurations by:
  performing the beam monitoring on the first serving downlink beam according to the first beam monitoring periodicity; and
  performing the beam monitoring on the second serving downlink beam according to the second beam monitoring periodicity.

12. A non-transitory computer-readable medium comprising a program code for performing the method according to claim 11 when the program code runs on a computer.

\* \* \* \* \*